(12) United States Patent
Larsen et al.

(10) Patent No.: US 9,709,203 B2
(45) Date of Patent: Jul. 18, 2017

(54) COLOR CHANGER MODULE AND COLOR CHANGER

(71) Applicant: ABB Technology AG, Zürich (CH)

(72) Inventors: Ole-Morten Larsen, Tananger (NO); Arnulf Krogedal, Sandnes (NO)

(73) Assignee: ABB Schweiz AG, Baden (CH)

( * ) Notice: Subject to any disclaimer, the term of this patent is extended or adjusted under 35 U.S.C. 154(b) by 695 days.

(21) Appl. No.: 13/720,180

(22) Filed: Dec. 19, 2012

(65) Prior Publication Data

US 2013/0153066 A1 Jun. 20, 2013

(30) Foreign Application Priority Data

Dec. 20, 2011 (EP) .................................... 11194633

(51) Int. Cl.
*B05B 12/14* (2006.01)
*F16L 37/23* (2006.01)
*F16L 55/00* (2006.01)
*B05B 15/02* (2006.01)

(52) U.S. Cl.
CPC ............ *F16L 55/00* (2013.01); *B05B 12/149* (2013.01); *B05B 15/025* (2013.01); *Y10T 137/87925* (2015.04)

(58) Field of Classification Search
CPC ......... Y10T 137/4238; Y10T 137/4245; Y10T 137/4259; Y10T 137/4358; Y10T 137/87917–137/87973; Y10T 137/87571; Y10T 137/87652; Y10T 137/8766; Y10T 137/87668; Y10T 137/87676; Y10T 137/87684; Y10T 137/87692; Y10T 137/87627; Y10T 137/87635; Y10T 137/87925; B05B 12/149; B05B 15/025; F16L 55/00
USPC .. 137/237, 238, 240, 246, 613–614.06, 602, 137/896–607, 861–887, 893, 894; 239/106, 12, 113, 581.2, 582.1, 304–308, 239/410–413, 416.1, 61, DIG. 14
See application file for complete search history.

(56) References Cited

U.S. PATENT DOCUMENTS

| | | | | |
|---|---|---|---|---|
| 3,348,774 A * | 10/1967 | Wiggins | .......................... | 239/70 |
| 3,672,570 A * | 6/1972 | Scarbrough et al. | ........... | 239/70 |
| 3,924,810 A * | 12/1975 | Otterstetter | ................... | 239/305 |
| 4,163,523 A * | 8/1979 | Vincent | ........................ | 239/305 |
| 4,231,392 A * | 11/1980 | Allibert | ...................... | 137/454.2 |
| 4,306,587 A * | 12/1981 | Tchebinyayeff | ............... | 239/124 |
| 4,403,736 A * | 9/1983 | Scharfenberger | ............. | 239/112 |
| 4,657,047 A * | 4/1987 | Kolibas | ........................ | 137/881 |
| 4,700,896 A * | 10/1987 | Takeuchi et al. | ............. | 239/693 |
| 4,921,169 A * | 5/1990 | Tilly | ................................ | 239/3 |
| 4,928,880 A * | 5/1990 | Prus et al. | ........................ | 239/8 |
| 5,102,045 A * | 4/1992 | Diana | ............................... | 239/3 |
| 5,365,972 A * | 11/1994 | Smith, III | ................ | F16L 1/26 137/614.04 |
| 5,402,826 A * | 4/1995 | Molnar et al. | ............. | 137/614.01 |
| 5,759,277 A * | 6/1998 | Milovich et al. | ............. | 118/629 |
| 6,360,961 B1 * | 3/2002 | Marazzi | ........................ | 239/104 |

(Continued)

*Primary Examiner* — Craig J Price
(74) *Attorney, Agent, or Firm* — Barnes & Thornburg LLP

(57) ABSTRACT

Exemplary embodiments relate to a color changer module including an inlet channel, an outlet channel, a duct channel arranged between them to form a fluidic connection, and a first valve for interrupting the duct channel. A docking valve, lies fluidically in series with the first valve and with which the duct channel can also be interrupted.

6 Claims, 3 Drawing Sheets

(56) References Cited

U.S. PATENT DOCUMENTS

| | | | |
|---|---|---|---|
| 6,619,563 B2* | 9/2003 | van der Steur | 239/125 |
| 2003/0015607 A1* | 1/2003 | Ehinger et al. | 239/526 |
| 2012/0312414 A1* | 12/2012 | Nabeshima et al. | 141/2 |
| 2013/0032213 A1* | 2/2013 | Borner | 137/1 |

* cited by examiner

COLOR CHANGER MODULE AND COLOR CHANGER

RELATED APPLICATION(S)

This application claims priority under 35 U.S.C. §119 to Application No. EP 11194633.1 filed in Europe on Dec. 20, 2011, the content of which is hereby incorporated by reference in its entirety.

FIELD

The disclosure relates to a color changer module comprising an inlet channel, an outlet channel, a duct channel arranged between them to form a fluidic connection, and a first valve means for interrupting the duct channel. The disclosure also relates to a color changer.

BACKGROUND INFORMATION

It is known that a multiplicity of different color shades is used in industrial paint lines, for example in paint lines for automobile bodies or attachments. Paint lines of this kind can be robot-based, and with cycle times of 60 s to 90 s, for example, can be designed to paint a different color shade in each cycle, 20 to 60 different color shades can be a common number in the automobile industry. Color changers can be provided in order, for example, to supply an atomizer mounted on a robot arm with a paint material of a specified color shade. These have a multiplicity of inlets for paint material which are connected to appropriate supply lines for the different paint materials. As a rule, the paint materials are made available at different take-off points along the paint line by means of so-called ring mains, and from there are fed to the respective color changer by means of the supply lines. A color changer also has a common manifold channel, into which the supply lines open out at least indirectly, its outlet being connected by means of a line to the atomizer which is to be supplied with paint material.

Valve means are provided between the respective inlets of the color changer and the common manifold channel. Depending on which of the valve means is open, the appropriate paint material is fed into the manifold channel during painting and from there routed to the atomiser. At least one inlet of a color changer is usually connected via a valve means to a solvent line in order, in the event of a color change, to clean the manifold channel for the next paint material with a different color shade. A supply of an air-solvent mixture, which is produced by an alternating pulsed supply of air and solvent, is also frequently used when cleaning. The cleaning effect of such a mixture is considerably increased while the solvent consumption is reduced.

The strict separation of different color shades is of great importance, as even the smallest color residues can lead to an alteration of the color shade, for example in the case of a marginal residue of a red color shade in a white color shade. Valve means are subject to wear, and leakages can therefore also occur in the course of time. When a valve means no longer closes reliably, then, in spite of an actually closed state of a valve means, marginal quantities of a paint material of a first color shade can find their way into the manifold channel and mix with a paint material of a different color shade located therein.

Leakage faults of this kind cannot be seen from outside a color changer. They are therefore usually only discovered very late, namely for example on a significantly defectively painted body. Depending on the combination of the successive color shades, faults of this kind may also only be discovered after several days on the basis of a defectively painted body. The damage resulting from defectively painted bodies is considerable, as these have to be completely refurbished and repainted. As, in a paint line, a multiplicity of paint robots are involved sequentially in painting one and the same object, the association of defective painting with a respective paint robot or the color changer belonging thereto usually proves to be very difficult or impossible. When a paint changer is defective, a paint line therefore usually has to be shut down for the duration of fault finding, as a result of which its production capacity is reduced in a disadvantageous manner.

SUMMARY

An exemplary color changer module is disclosed comprising: an inlet channel and an outlet channel; a duct channel arranged between the inlet and outlet channels to form a fluidic connection; a first valve means for interrupting the duct channel; and a docking valve in series with the first valve means and with which the duct channel can also be interrupted.

An exemplary color changer is disclosed comprising: a plurality of color changer modules arranged next to one another in a row, wherein each color change module including: an inlet channel and an outlet channel; a duct channel arranged between them to form a fluidic connection; a first valve means for interrupting the duct channel; and a docking valve in series with the first valve means and with which the duct channel can also be interrupted.

BRIEF DESCRIPTION OF THE DRAWINGS

The disclosure, further embodiments and further advantages are described in more detail with reference to the exemplary embodiments shown in the drawings.

In the drawings.

DETAILED DESCRIPTION

Figure 1:
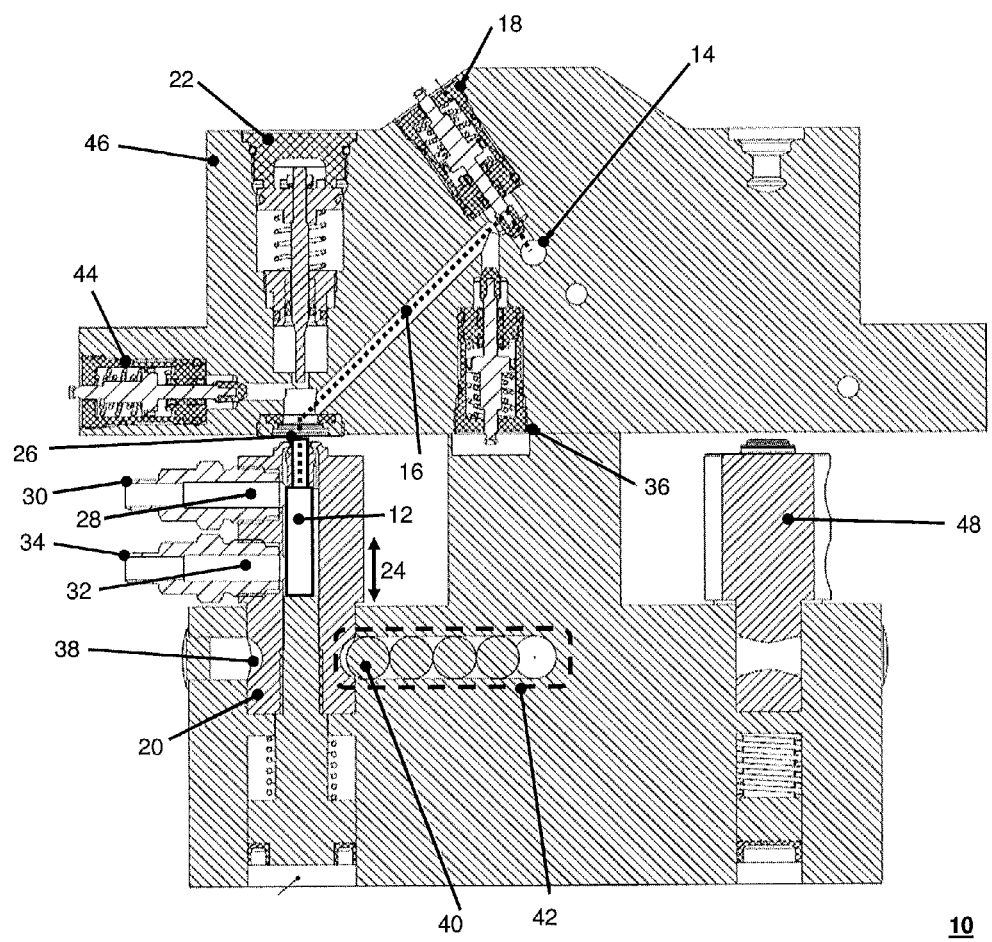
FIG. 1 shows a first exemplary color changer module in accordance with an exemplary embodiment of the present disclosure.

Exemplary embodiments of the present disclosure specify a color changer module and a color changer which are distinguished by a high reliability with regard to the avoidance of possible color carryover.

The exemplary embodiments provide a color changer module having a docking valve, which lies fluidically in series with the first valve means and with which the duct channel can also be interrupted.

Moreover, the exemplary embodiments disclosed herein achieve an increased leakage protection of the duct channel by means of the fluidic series connection of a plurality of valve means. The probability that two series connected valve means leak at the same time is fundamentally reduced. Using a docking valve as an additional switching means also enables the duct channel to be interrupted with absolute certainty. With a docking valve, the occurrence of a leak due to the duct channel is physically impossible. A docking valve has two coupling pieces which, in the event of an interruption, are moved mechanically away from one another and are therefore separated. Each of the two coupling pieces has its own valve-like closing mechanism.

If one of the two coupling pieces should have a defective closing mechanism or a leak, then, on the one hand, due to their mechanical separation, this does not lead to color carryover, as the paint material which then escapes drips out of the faulty coupling pieces but does not find its way into the opposing coupling piece. On the other hand, a possible leakage can be visually detected reliably and quickly due to the escape of paint material.

By appropriately arranging identically constructed or similarly constructed modules next to one another in a row, the modular design of a color changer module according to the disclosure enables a color changer which is to be formed therefrom to be matched to the operational specifications such as the number of color shades to be switched.

An exemplary color changer module according to the present disclosure advantageously includes reliably closable duct channel, wherein a possible malfunction of one of the valve means can be discovered visually and also does not lead to any color carryover.

According to an exemplary embodiment of the color changer module according to the disclosure, the docking valve has a first valve part which encompasses the inlet channel and a second valve part which is matched thereto, wherein at least the first valve part is movable so that, by means of an appropriate coupling movement, both valve parts can be hermetically coupled to one another at appropriate coupling surfaces or completely separated from one another. Each of the two valve parts has a valve-like closing mechanism which, in the open state, reliably seals the respective end of the then interrupted duct channel. As a result of the valve parts moving mechanically apart, for example by a few millimeters, paint material is prevented from finding its way through the duct channel in the event of a defective valve-like switching means.

A linear movement substantially perpendicular to the respective coupling surfaces can be provided as the coupling movement. In order to guarantee a hermetically sealed connection in the closed state, the coupling surfaces have sealing devices or sealing rings, which usually specify a compression force. A linear movement perpendicular to the coupling surface enables such a force to be produced easily, wherein, in an advantageous manner, a rubbing movement of the coupling surfaces, which would lead to increased wear, is avoided.

According to another exemplary embodiment of the color changer module according to the disclosure, the first moving valve part is designed for connecting a flexible paint supply line thereto which opens out at least indirectly into the inlet channel. By connecting a flexible paint supply line, a coupling movement of the first valve part is namely easily compensated for in an advantageous manner by a corresponding movement of the flexible paint supply line without additional mechanical slipping or sliding connections being necessary.

In another exemplary embodiment disclosed herein color, the first moving valve part is also designed for connecting a flexible return line thereto which opens out at least indirectly into the inlet channel, so that a material circulation from the paint supply line into the return line is enabled at least when the docking valve is closed. A continuous circulation of the paint material is of great advantage for preventing a sedimentation of color pigments, such as with paint materials of a special color which, for example, are only used a few times a day. The flexible return line also advantageously compensates for a coupling movement of the first valve part.

According to a further exemplary embodiment of the color changer module according to the present disclosure, a second valve means is provided for supplying air and/or a cleaning fluid, for example a solvent, into the duct channel. This enables the outlet channel and parts of the duct channel to be cleaned, thus enabling a color change to be carried out reliably in a color changer which is made up of a plurality of color changer modules.

In still another exemplary embodiment of the present disclosure, the color changer module has a central return channel and a third valve means is provided for connecting the duct channel to the central return channel. Such a central return channel is also referred to as a 'dump' and is used for the fluidic return path of the duct channel into a collecting tank or similar shortly before it merges with the outlet channel. By this means, for example, a paint material with a new color shade can be forced into one color changer module of a color changer while paint material for a paint job is still flowing via a further color changer module of the same color changer. A color change of this kind is found, for example, with very rarely used special colors.

According to an exemplary embodiment of the present disclosure, the color changer module is designed in a disc-like manner, wherein a plurality of identical or at least similar color changer modules can be arranged next to one another in a row and wherein a continuous outlet channel, which extends transversely over the row of color changer modules, and if necessary a continuous central return channel is then formed. A modular design of this kind enables a color changer to be constructed flexibly and as specified from a plurality of individual modules.

An exemplary embodiment can also include a color changer having a plurality of color changer modules arranged next to one another in a row. The number of color changer modules or duct channels formed thereby in each case is 5 to 60 depending on the application.

In an exemplary color changer according to the disclosure, a lock or locking mechanism is provided by means of which the respective docking valves are interlocked against one another. Interlocking means that it is mechanically impossible to set more than exactly one docking valve to the closed state, such as with connected duct channel in each case. This prevents a mixing of colors due to incorrect control of the docking valves, as a result of which the operational reliability of the color changer is further improved in an advantageous manner. According to the disclosure, the lock or locking mechanism is realised mechanically, mechanically-pneumatically, electrically and/or by a program control. Therefore, an appropriate control mechanism can be designed in such a way that the simultaneous closing of a plurality of docking valves is not possible from a control point of view.

According to an exemplary embodiment of the color changer according to the disclosure, the moving first valve part of the respective docking valve has a depression, opposite which a respective interlocking channel opens out, and wherein a respective contact means, which is pushed out of the depression into the respective interlocking channel when the respective docking valve opens, is provided, so that the free internal volume of the respective interlocking channel is reduced by a switching volume, wherein, at their respective other ends, the respective interlocking channels extend into a common closed central interlocking channel which extends over all color changer modules. According to another exemplary embodiment of the color changer, the closed and interconnected interlocking channels are filled with an incompressible medium which fills all interlocking channels less exactly one switching volume when the docking valves are closed.

An exemplary interlocking mechanism as described herein provides a closed system of interconnected interlocking channels which is almost completely filled with an incompressible medium. An interlocking channel opens out behind each docking valve which is to be interlocked against another. For the case where all docking valves are open, when a first docking valve is closed, the respective contact means is pushed out of the depression into the system of interlocking channels so that the internal volume of the interlocking channels is reduced by a corresponding switching volume. The amount of incompressible medium is such that it has exactly one switching volume less than the total volume of the channel.

In each case, it is therefore possible to push-in a first contact means. Any pushing-in of a further contact means is now no longer possible as, in this case, the interlocking channel system is then completely filled with an incompressible medium. The arrangement of a contact means which engages mechanically in a depression of the moving first part of the respective docking valve is designed such that a movement of the respective first valve part of the docking valve is impossible with the contact means engaged. In an advantageous manner this mechanically prevents a coupling movement for all further docking valves as long as a first docking valve is closed. When the docking valve which is closed at any desired time is opened, a compressible internal volume inside the interlocking channel system is available once more so that exactly one of the docking valves can be closed. An example of a suitable contact means is a ball which has the same inside diameter as the respective interlocking channel. This is made from a metal or some other hard material, for example. The cross section of the depression is matched to the outside diameter of the ball and is designed, for example, as a peripheral groove with a semicircular cross section.

According to another exemplary embodiment of the present disclosure, the incompressible medium is formed by balls, the diameter of which can be matched to the diameter of the interlocking channels. Balls of this kind have a flow-like characteristic and are to a great extent incompressible and at the same time can be used as the respective contact means. By this means, a simple and reliable construction of an appropriate interlocking mechanism is realised.

However, it is also a variant of a color changer according to the disclosure that the incompressible medium is formed by a hydraulic fluid. Here, the interlocking channels should in each case be hermetically sealed, as should the interlocking means at the respective interlocking channels which open out opposite the first valve parts of the docking valves.

However, according to the disclosure, it is also provided that one or more rods or similar are used as the incompressible medium. In a special embodiment of the disclosure, these then interleave with one another in a similar way to the lever mechanism of a locking cylinder of a lock, so that this likewise guarantees an interlocking.

In yet another exemplary embodiment of the color changer according to the disclosure, at least some of the color changer modules are arranged in a housing body which spans the modules. According to the present disclosure, color changer modules with two switchable duct channels in each case, for example, are arranged opposite one another on both sides of the common outlet channel in a common valve body, which is, for example, made from milled metal. However, sub-groups of, for example, 4, 5 or 6 color changer modules arranged in a common valve body or valve housing are also conceivable. This simplifies the production of a color changer according to the disclosure. However, the complete arrangement of, for example, 30 color changer modules in a common valve housing which also contains the continuous color outlet channel, a common return line and/or at least some of the interlocking channels, is also conceivable.

Further, possible exemplary embodiments can be seen from the further dependent claims.

FIG. 1 shows a first exemplary color changer module in accordance with an exemplary embodiment of the present disclosure. In a valve body 46, which, for example, is milled from metal, an outlet channel 14 is formed in the form of a transverse bore which extends through the housing 46 and into which a duct channel 16 opens out, as is shown by an appropriate dotted line. At its other end, the duct channel 16 opens out into an inlet channel 12 which, by way of example, is integrated in a first valve part 20 of a docking valve. The first valve part 20 of the docking valve can be moved up and down in the direction of the arrow with the reference number 24 enabling a coupling movement with a second valve part 22 of the docking valve to be carried out. Each of the two valve parts 20, 22 has a valve-like closing mechanism, so that the two valve parts 20, 22 are hermetically sealed when the docking valve is open.

In this way, the duct channel 16 can be reliably interrupted when the docking valve (20+22) is open, even if one of the valve-like closing mechanisms of one of the two valve parts 20, 22 is leaking. When the docking valve 20+22 is closed, the two valve parts are connected to one another at a common contact surface 26 in such a way that a paint material flow is enabled through the then coupled valve parts 20, 22.

Furthermore, the duct channel 16 can be interrupted by a first valve means 18, a standard compressed air operated valve, which is arranged directly at the outlet channel 14. Furthermore, a channel, which can be sealed by a second valve means 44 and which is provided for supplying an air-solvent mixture into the duct channel 16 for cleaning purposes, opens out into the duct channel 16. A third valve means 36 is provided for making a connection from the duct channel to a central return channel which is not shown.

A connecting piece 28 for a paint supply line 30 and a connecting piece 32 for a return line 34 open out into the inlet channel 12 which can be moved up and down together with the first valve part 20 of the docking valve. The flexible design of the lines 30, 34 compensates in an advantageous manner for a coupling movement of the first valve part 20 without additional mechanical outlay.

In the bottom part of the moving first valve part 20 of the docking valve, a peripheral depression 38 with a semicircle-like cross section is provided, behind which a first interlocking channel 42 opens out, the interlocking channel being part of an interlocking mechanism by means of which more than one docking valve in a color changer with a plurality of color changer modules is mechanically prevented from being switched at the same time. A plurality of metal balls with matched diameter is provided in the interlocking channel 42 in an abutting sequence, wherein the ball adjacent to the depression 38 serves as contact means 40. As long as the subsequent balls can move into the rear part of the interlocking channel 42, the contact means 40 is pushed into the interlocking channel 42 in the event of an upwards coupling movement of the first valve part 20, and the valve part 20 is able to move upwards.

In the event that another docking valve of the color changer is already closed, the balls cannot be pushed into the interior of the interlocking channel 42 and the contact means blocks an upwardly directed coupling movement of the first valve part. In an advantageous manner the docking valves of the color changer are therefore interlocked against one another and its operational reliability is further increased. An offset opposing docking valve of a further color changer module which is arranged in the same housing body 46 is shown by the reference number 48.

Figure 2:
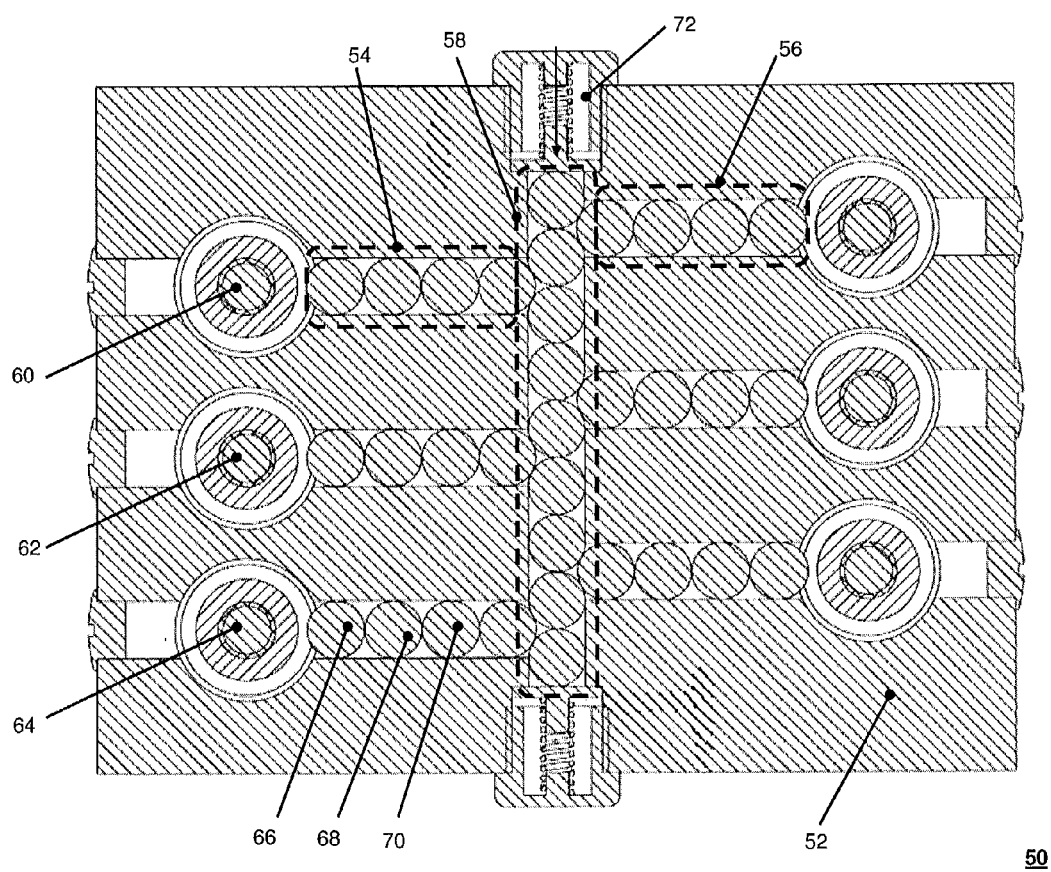
FIG. 2 shows a first color changer in accordance with an exemplary embodiment of the present disclosure.

FIG. 2 shows a first color changer in accordance with an exemplary embodiment of the present disclosure. The color changer is arranged in a housing body 52 which spans the modules and which is milled, for example, from a metal block. A plurality of interlocking channels 54, 56, which open out opposite a first moving valve part of a plurality of respective docking valves 60, 62, 64 in each case, emanate laterally from a central interlocking channel 58. The interlocking channels 54, 56, 58 are filled with a multiplicity of balls 66, 68, 70, the outside diameter of which is matched to the inside diameter of the channel. The balls 66, which in each case are movably arranged at the outer channel ends opposite the docking valves, serve as a contact means which is pushed out of a respective depression into the system of connected interlocking channels 54, 56, 58 on a closing coupling movement of the respective first valve part of one of the docking valves 60, 62, 64. Spring elements 72, which allow the volume of the system of interlocking channels 54, 56, 58 to be increased by exactly one switching volume, that is to say exactly the volume by which a contact means is pushed into the respective interlocking channel 54, 56 when the docking valve is actuated, are in each case provided at the axial ends of the central interlocking channel 58. In this state, a coupling movement of one of the further docking valves is prevented by the contact means 66 which engages in the respective depression. This guarantees that, at a point in time, a maximum of exactly one docking valve 66, 68, 70 can be closed and the docking valves 66, 68, 70 are thereby interlocked against one another.

Figure 3:
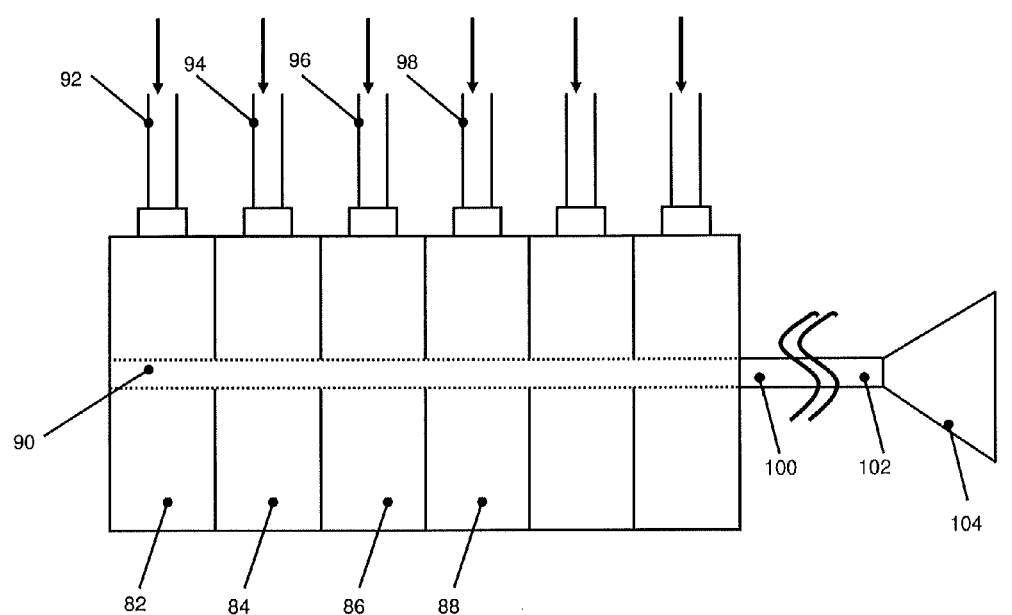
FIG. 3 shows a second exemplary color changer in accordance with an exemplary embodiment of the present disclosure.

FIG. 3 shows a second exemplary color changer in accordance with an exemplary embodiment of the present disclosure. FIG. 3 shows a second exemplary color changer with an atomizer 104 connected thereto in a schematic drawing 80. The color changer has a multiplicity of identical disc-like color changer modules 82, 84, 86, 88 equivalent to the color changer module 10 of FIG. 1, into which respective paint supply lines 92, 94, 96, 98 open out. Each of the color changer modules 82, 84, 86, 88 has a duct channel which can be switched by means of a docking valve (not shown) and which opens out into a common outlet channel 90, equivalent to the outlet channels 14 of each color changer module 82, 84, 86, 88, in each case. For its part, this is connected to an atomizer 104, for example a rotary or air atomizer, by means of a plurality of lines 100, 102.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCES

10 First exemplary color changer module
12 Inlet channel
14 Outlet channel
16 Duct channel
18 First valve means
20 First valve part of docking valve
22 Second valve part of docking valve
24 Direction of movement of the first valve part
26 Coupling surfaces
28 Connecting piece to paint supply line
30 Paint supply line
32 Connecting piece to return line
34 Return line
36 Third valve means
38 Depression in first valve part of docking valve
40 Contact means
42 First interlocking channel
44 Second valve means
46 Housing body
48 Offset opposing docking valve
50 First exemplary color changer
52 Module-spanning housing body
54 Second interlocking channel
56 Third interlocking channel
58 Central interlocking channel
60 First docking valve of color changer
62 Second docking valve of color changer
64 Third docking valve of color changer
66 First ball/contact means
68 Second ball
70 Third ball
72 Spring element
80 Second exemplary color changer
82 First color changer module of color changer
84 Second color changer module of color changer
86 Third color changer module of color changer
88 Fourth color changer module of color changer
90 Outlet channel
92 First paint supply line
94 Second paint supply line
96 Third paint supply line
98 Fourth paint supply line
100 Output line
102 Feed line to atomizer
104 Atomizer

What is claimed is:
1. A color changer module comprising:
a plurality of color changer modules arranged next to one another in a row, each color changer module having:
an inlet channel and an outlet channel;
a duct channel arranged between the inlet and outlet channels to form a fluidic connection;
a first valve for interrupting the duct channel; and
a docking valve in series with the first valve and with which the duct channel can also be interrupted,
wherein the outlet channels among the plurality of color changer modules are connected to form a common outlet channel of the row of color changer modules,
wherein the common outlet channel extends through the row of color changer modules, and serves as a central return channel for the row of color changer modules, and wherein the docking valve has a first valve part which encompasses the inlet channel and a second valve part, wherein at least the first valve part is movable so that, through a coupling movement, both valve parts can be hermetically coupled to one another at coupling surfaces or completely separated from one another.

2. The color changer module according to claim 1, wherein the coupling movement includes a linear movement that is substantially perpendicular to the respective coupling surfaces.

3. The color changer module according to claim 1, wherein the first valve part is configured to connect to a paint supply line which opens out fluidically into the inlet channel.

4. The color changer module according to claim 3, wherein the first valve part is configured to connect to a return line which opens out into the inlet channel, so that a material circulation from the paint supply line into the return line is enabled at least when the docking valve is closed.

5. The color changer module as claimed in claim 1, comprising:
   a second valve for supplying air and/or a cleaning fluid into the duct channel.

6. The color changer module according to claim 1, comprising:
   a third valve for connecting the duct channel to the central return channel.

\* \* \* \* \*